Dec. 9, 1930.    O. J. LEINS    1,784,636
VALVE STRUCTURE
Filed Feb. 23, 1928
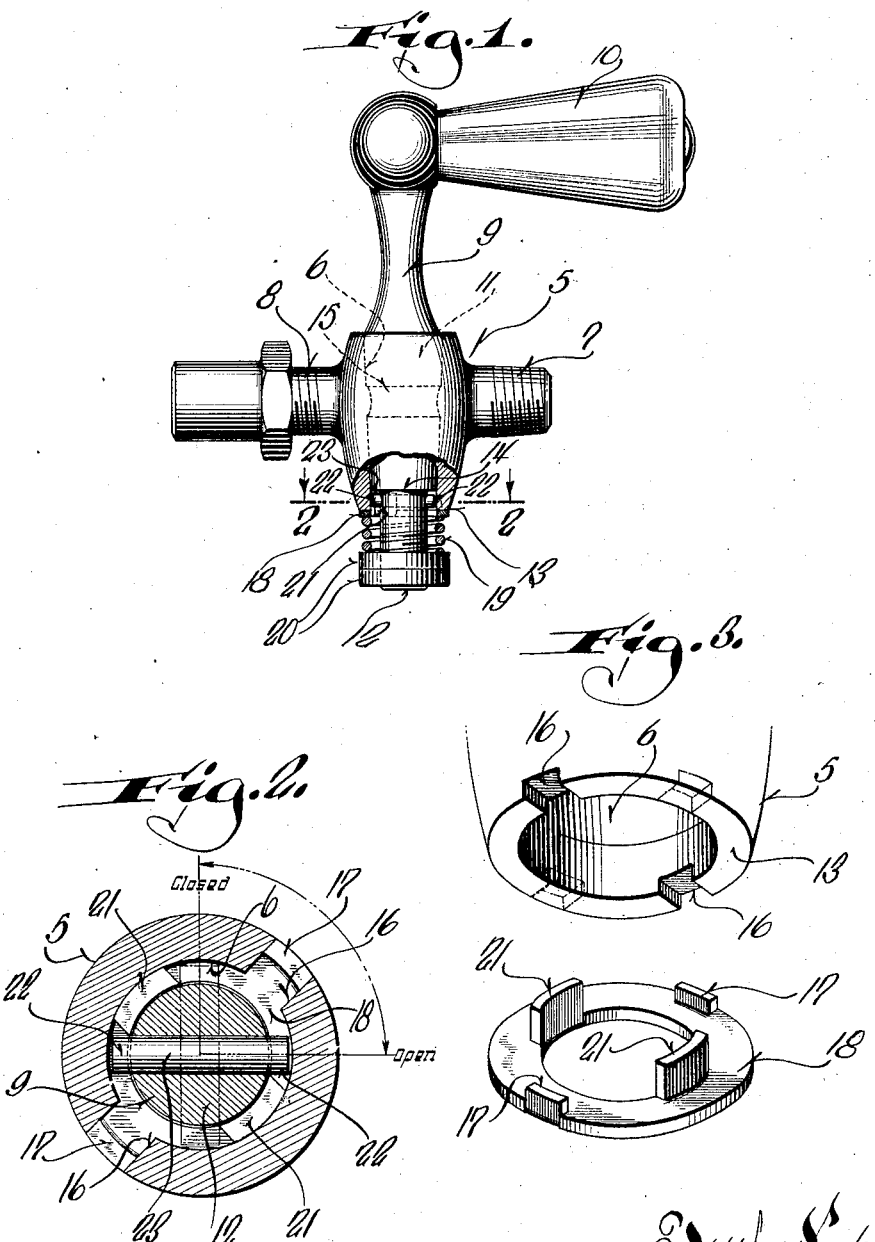

Patented Dec. 9, 1930

1,784,636

UNITED STATES PATENT OFFICE

OSCAR J. LEINS, OF MILWAUKEE, WISCONSIN, ASSIGNOR TO CLAUS MANUFACTURING CO., OF MILWAUKEE, WISCONSIN, A CORPORATION OF WISCONSIN

VALVE STRUCTURE

Application filed February 23, 1928. Serial No. 256,307.

This invention relates to certain new and useful improvements in valve structures and refers more particularly to valves for use in connection with gas stoves commonly known as gas cocks.

In gas cocks now in general use, one end of the barrel is milled or grooved to provide a pair of spaced shoulders or projections with which a pin carried by the plug cooperates to define the open and closed positions of the plug. This structure is open to several objections, as, when in actual use upon a stove, the pin and groove in which it functions collects dust, dirt and grease which frequently causes soiling of the user's wearing apparel, and, further, as only one end of the pin functions as a stop, it soon becomes weakened through use, frequently shearing off, thus making it difficult to ascertain the true open and closed positions. Another objectionable feature is that, by reason of this construction, the pin must be applied to the plug after the parts have been ground and as the pins are inserted with the aid of a hammer, much damage is caused after the grinding operation which materially increases the manufacturing cost.

Having the above and other objections to the conventional types of gas cocks in mind, this invention has as an object the provision of an improved structure of this character wherein a stop pin may be applied to the plug prior to grinding, whereby damaged material may be rejected before being ground, to thus reduce the cost of manufacture.

Another object of this invention resides in the provision of an improved valve structure of the character described in which both ends of the stop pin cooperate with stop members to define the open and closed positions of the plug whereby the shearing stress thereon is divided in two, reducing the possibility of failure of the stop means.

A further object of this invention resides in the provision of an improved valve structure wherein the angular position of the valve handle at its limits of movement may be readily changed by the simple expedient of detaching a washer member, rotating the plug and placing the washer member in position again.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a side, elevational view with parts broken away and in section, of a gas cock embodying my invention;

Figure 2 is an enlarged, detail sectional view, with parts in elevation, taken through Figure 1 on the plane of the line 2—2; and Figure 3 is a fragmentary, perspective view of the lower end of the barrel and cooperating stop washer and sleeve member separated therefrom.

Referring now more particularly to the accompanying drawing, in which like numerals designate like parts throughout the several views, 5 designates a valve body or barrel having a tapered bore 6 extending therethrough with which inlets and outlets 7 and 8, respectively, communicate, a plug 9 having a ground fit in the bore controlling the flow of fluid from the inlet to the outlet.

The plug 9 has an operating handle 10 at its upper end and its lower end is tapered, as at 11, to conform with that of bore 6 with its extreme end 12 reduced in diameter from a point inwardly of the lower end face 13 of the barrel to define a shoulder 14. A port 15 extends transversely through the portion 11 of the plug to connect the inlet and outlet when its ends are in register therewith.

The end 13 of the barrel has notches or grooves 16 milled or otherwise formed therein, into which the tongues or lugs 17 of a plate or washer 18 are engageable, the plate being held in place by an expansible spring 19 coiled about the end 12 of the plug, which is externally threaded, and confined between the plate or washer and a pair of lock nuts threaded on the plug end. The spring 19, in addition to maintaining the plug or washer 18 in place, exerts a tension to maintain the plug properly seated in the barrel bore.

A pair of opposed arcuate tongues or projections 21 extend upwardly from the plate or washer 18 at its inner periphery to lie between the wall of the bore 6 and the reduced end portion 12 of the plug, below the shoulder 14 to cooperate with the ends 22 of a pin 23. The length of pin 23 is slightly less than the smallest diameter of the bore 6 and is passed through the plug reduced end at a point inwardly of the end of the barrel, the ends of the pin abutting the tongues 21 at the open and closed positions of the plug, as best shown in Figure 2.

The pin 23 is inserted in the plug prior to its being ground in the barrel bore so that the possible loss in manufacture due to damage arising from faulty insertion of the pin is reduced to a minimum. Further, both ends of the pin cooperating with the stop reduces the shearing stress thereon and eliminates possibility of failure of the stops and consequent uncertainty of position. The open and closed positions may be readily changed by the simple expedient of loosening the nuts 20 and moving the washer or plate 18 away from the end 13 of the barrel sufficiently to move the tongues 21 out of the path of the pin ends when the plug is rotated to the position desired and the nuts again tightened.

With the construction illustrated in the drawing, two positions are provided for the handle 10 at either of its limits of movement and by the simple expedient of providing an additional pair of notches or recesses 16, two additional positions for the handle may be provided.

From the foregoing description taken in connection with the accompanying drawing, it will be readily apparent to those skilled in the art to which an invention of the character described appertains, that I have provided an improved and novel valve structure which readily lends itself to quantity of manufacture with a minimum of loss due to damage in manufacture, which is capable of production at a lower cost and which is practical and durable in use.

What I claim as my invention is:

1. In a valve structure including a barrel having a bore with which an inlet and an outlet communicates and a plug rotatable in the barrel bore to control the flow of fluid from the inlet to the outlet, one end portion of the plug being reduced in diameter, a pin inserted through the plug at the inner portion of said reduced end with its ends inwardly of the circumference of the plug inwardly of said reduced end, said pin being located within the barrel bore, a washer member engaging the end of the barrel adjacent the reduced end of the plug, a stop carried by the washer member and extended into the barrel bore to lie within the path of the plug carried stop, and a projection extended from the washer member and engageable in a notch in the adjacent barrel end to prevent rotation of the washer member with respect to the barrel.

2. In a valve structure including a barrel having a tapered bore with which an inlet and an outlet communicates, a tapered valve plug rotatable in the bore with its ends extended therebeyond and a handle on one extended end of the plug, the other end of the plug being reduced in diameter from a point within the barrel bore, a pin passed through the reduced end of the plug and located within the barrel bore with its ends extended beyond the plug sides but within the circumference of the barrel bore smallest diamter, a washer member engaging the end of the barrel adjacent the smallest diameter of the bore, projections carried by the washer member and engaging in notches in the barrel end to prevent its rotation with respect to the barrel, stops extended upwardly from the washer member into the barrel bore to lie within the path of the pin ends to define the open and closed positions of the valve, a spring coiled around the reduced end of the plug outwardly of the washer member, means on the extreme outer end of the reduced portion of the plug to maintain the spring under compression, said spring maintaining a tight fit between the plug and barrel and maintaining the washer member in position.

3. In a valve structure including a barrel having a bore with which an inlet and an outlet communicates and a plug rotatable in the barrel bore to control the flow of fluid from the inlet to the outlet, one end portion of the plug being reduced in diameter, a pin inserted through the plug at the inner portion of its reduced end with its ends inwardly of the circumference of the plug inwardly of its reduced end, said pin being located within the barrel bore and forming a plug carried stop, a washer member engaging the end of the barrel adjacent the reduced end of the plug, a projection extending laterally from the washer member and into the barrel bore to lie within the path of the plug carried stop, and a second projection extending from the washer member and received in a recess in the barrel end to restrain the washer against turning.

In testimony whereof I have hereunto affixed my signature.

OSCAR J. LEINS.